Figure 9:
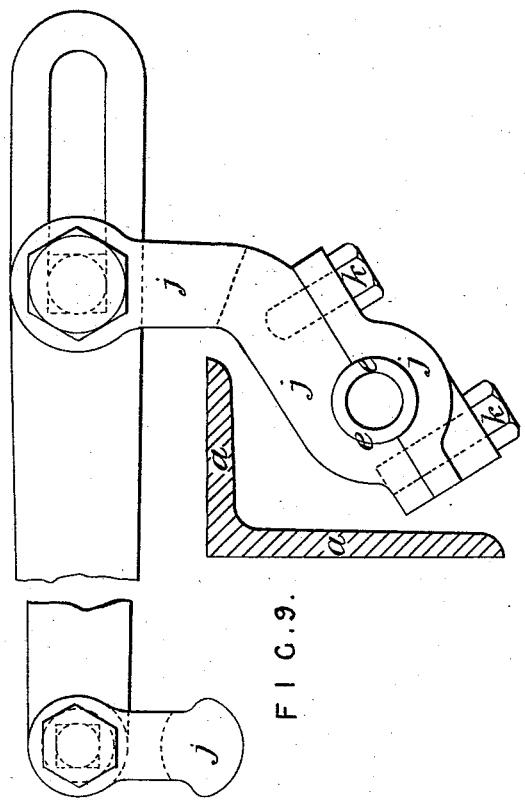

(No Model.) 4 Sheets—Sheet 1.
T. J. TRESIDDER.
APPARATUS FOR INDICATING THE WARPING, &c., OF ARMOR PLATES, &c., DURING THE PROCESS OF CHILLING.
No. 543,362. Patented July 23, 1895.
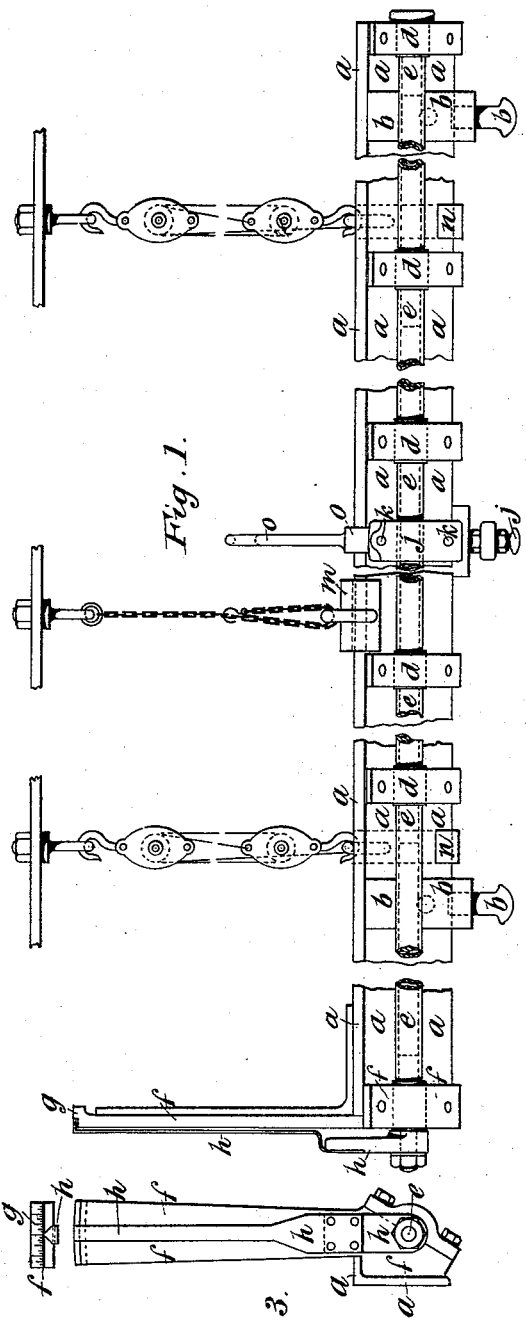
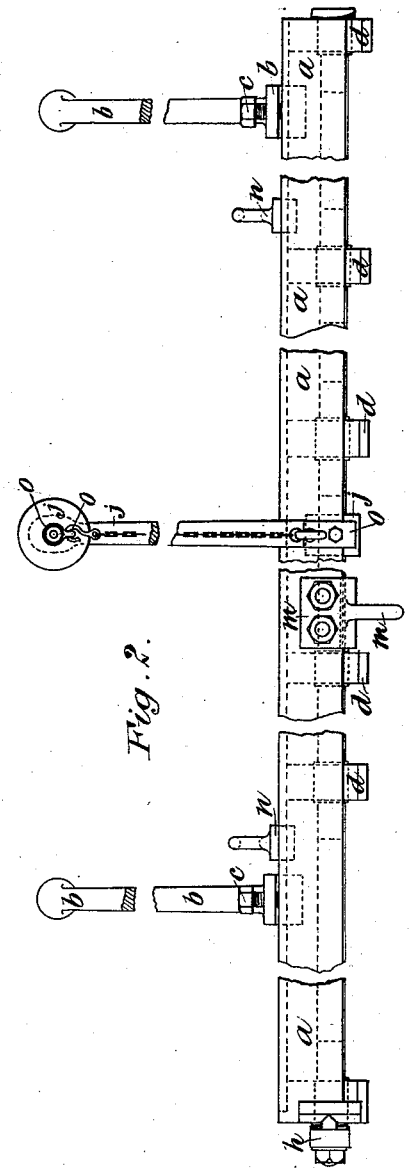
Witnesses
Thos. E. Robertson
W. E. Clendaniel
Inventor
Tolmie John Tresidder
By T. J. W. Robertson
Attorney

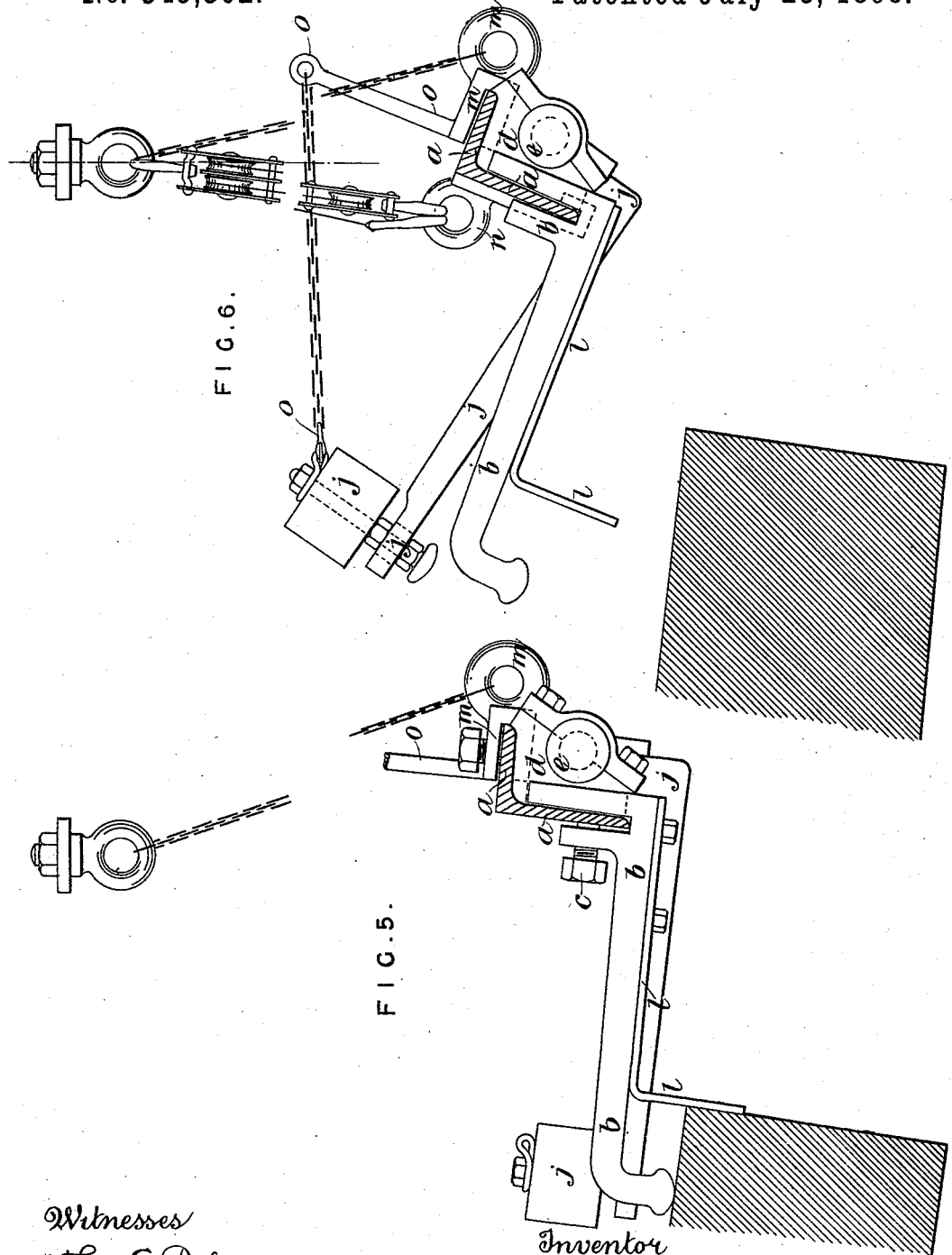

(No Model.) 4 Sheets—Sheet 3.
T. J. TRESIDDER.
APPARATUS FOR INDICATING THE WARPING, &c., OF ARMOR PLATES, &c.,
DURING THE PROCESS OF CHILLING.
No. 543,362. Patented July 23, 1895.
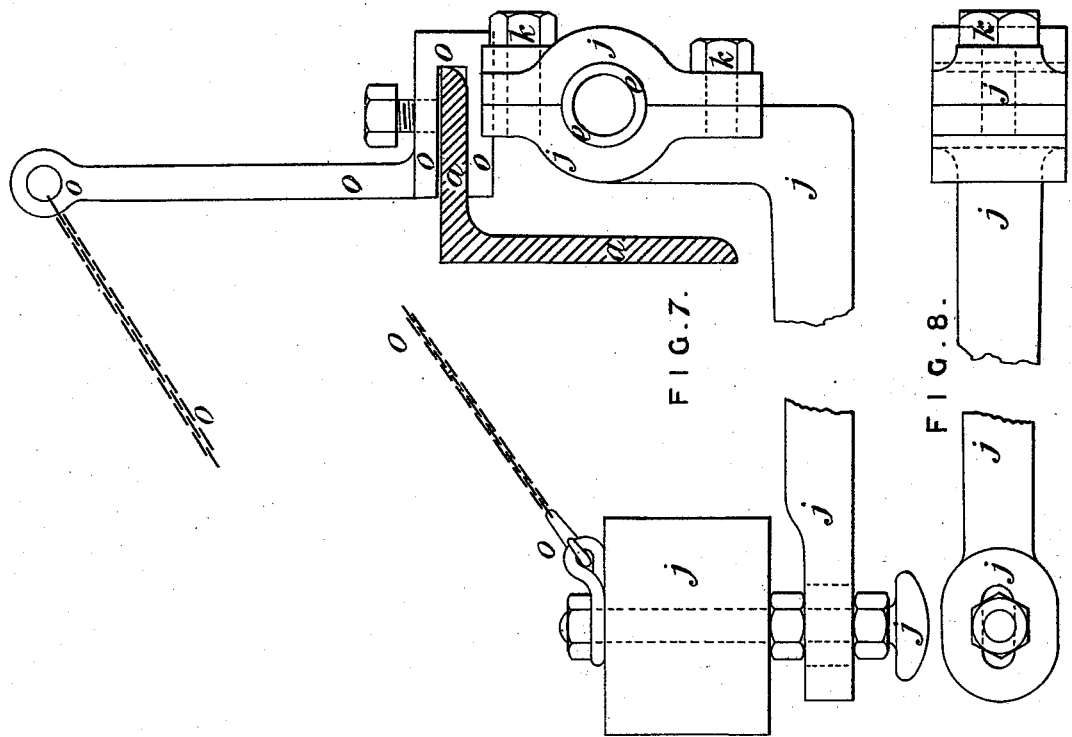
Witnesses
Thos. E. Robertson
W. E. Clendaniel.
Inventor
Tolmie John Tresidder
By T. J. W. Robertson
Attorney.

(No Model.) 4 Sheets—Sheet 4.

T. J. TRESIDDER.
APPARATUS FOR INDICATING THE WARPING, &c., OF ARMOR PLATES, &c., DURING THE PROCESS OF CHILLING.

No. 543,362. Patented July 23, 1895.

Witnesses
Jno. E. Robertson
W. E. Clendaniel

Inventor,
Tolmie John Tresidder
By T.J.W.Robertson
Attorney.

UNITED STATES PATENT OFFICE.

TOLMIE J. TRESIDDER, OF SHEFFIELD, ENGLAND, ASSIGNOR TO JOHN BROWN & CO., LIMITED, OF SAME PLACE.

APPARATUS FOR INDICATING WARPING, &c., OF ARMOR-PLATES, &c., DURING PROCESS OF CHILLING.

SPECIFICATION forming part of Letters Patent No. 543,362, dated July 23, 1895.

Application filed March 4, 1895. Serial No. 540,490. (No model.)

*To all whom it may concern:*

Be it known that I, TOLMIE JOHN TRESIDDER, captain, late of Her Majesty's Royal Engineers, a subject of the Queen of Great Britain and Ireland, residing at The Atlas Iron and Steel Works, Sheffield, in the county of York, England, have invented a certain Apparatus for Automatically Indicating or Indicating and Recording the Warping or Change in Form of Armor-Plates or the Like During the Process of Chilling or Hardening Them, of which the following is a specification.

In the manufacture of hard-faced armor-plates or the like where the final hardness of the face is produced by chilling in the manner, for instance, described in the specification of Letters Patent of the United Kingdom of Great Britain and Ireland No. 5,551, of 1891, granted to me, it is necessary to pay close attention to progressive alterations of form produced during the chilling, in order that these alterations may be checked, reversed, encouraged, or modified, as desired, in so far as they are controllable. It has hitherto been the practice to frequently test the shape of the plate with a templet while the chilling is in progress, and to regulate the amount of water applied to either side of the plate according to the result of these tests. This is, however, very unsatisfactory, as the workman can form only an approximate idea of the shape of the plate at intervals and is greatly inconvenienced by being wetted by the chilling water, which, together with the steam, also prevents him from properly estimating the amount of deviation from the templet.

The object of my invention is to obtain a continuous automatic and accurate indication, or both indication and record, of the changes of form the plate undergoes, in order thereby to enable the warping or change of form to be most effectually controlled as it goes on and the final inaccuracy to be minimized.

According to my invention I employ a device which rests on the plate at points suitably selected, so that as the form of the plate varies the relative positions of these points of rest alter and the changed position is conveyed to an indicator or indicator and recorder or to indicators or indicators and recorders.

It is generally advisable to ascertain what is the amount and nature of that portion of the change of form which is inevitable in plates of various shapes and proportions, in order that this inevitable change may be allowed for in the original bend of subsequent similar plates—*i. e.*, in the design of the false templets referred to in the aforesaid specification of Letters Patent No. 5,551, of 1891. The apparatus according to this invention is also useful in enabling this to be done, as by it there can be obtained a rapid and accurate indication of the change of form which the plate has undergone in the furnace or while being removed therefrom and conveyed to and placed in position for the application of the douche.

The apparatus may consist, for example, of a long bar or frame from which two feet project. These feet can be moved along the bar or frame and be clamped rigidly to it. These two feet are adjusted, so that they will rest on the face of the armor-plate near its edge and form two out of three points of support of the bar or frame, respectively, at or toward the opposite extremities of the edge of the plate which is under treatment and whose behavior is to be observed. The third point of support is a third foot, which projects away from the armor-plate from a point about midway between the other feet and rests on the ground or is otherwise supported. Thus arranged it will be seen that the bar or frame partakes of the motion of the corners of the plate on which two of its feet rest. The bar or frame carries parallel with itself an axle which can turn easily in bearings attached to the bar or frame. To this axle a fourth foot is clamped projecting toward the armor-plate about midway between the other two and on the same side of the bar. This foot rests on the face of the armor-plate in line with the other two, and if it rises or falls it has no effect on the bar but turns the axle. At one end this axle carries an indicator—such as a pointer—reading against an index or scale attached to the bar and so adjusted as to read zero when the three feet on the armor-plate are in one straight line every way, (i. e., when that part of the plate is flat, if flatness be desired,) or when the three feet are all points in the correct curve when the edge is to finish with a bend. Any deviation from the desired form in that part of the plate must cause the two feet attached to the bar to alter their position in relation to the one attached to the axle, whereby the axle rotates and the indicator or pointer indicates the movement continuously. The attendant can watch by means of the indications of this apparatus the warping or movements of the plate and be able without being incommoded by the water or steam to tell accurately whether the plate is becoming rounded or hollowed, and to what extent it is so at any moment, and whether it is getting and at what rate it is getting more rounded or hollowed. In order that a record may be kept of the behavior of any plate to be utilized in forecasting the behavior of other plates and determining the laws governing the warping or movement, the indications of the pointer may be noted at intervals, or, if it be desired to make the record automatic, I attach to the index-arm or the bar or frame a cylinder carrying a paper and driven by clockwork, and to the pointer I attach a pencil or marker, so that the cylinder being started when the douching begins the pencil or marker makes on the paper a diagram of the warping or movement. For edges that are intended to finish flat or to a uniform curve, three feet resting on the armor-plate, (two being clamped to the bar and one to the axle,) as described, are preferred; but should it be desired to watch the movement of a greater number of points in the same edge then the axle, as well as the two extreme feet, should be clamped rigid with the bar, and as many intermediate feet as desired should be placed to turn loose on the axle as a pivot, each of such intermediate feet having its own indicator or pointer attached to or connected with it to indicate (or indicate and record) separately, as hereinbefore described.

In order that my invention may be well understood I will describe, with reference to the accompanying drawings, a form of apparatus which is the best means with which I am acquainted for carrying my invention into effect.

The same letters of reference are employed to indicate the same or like parts in the several figures.

The accompanying drawings show an apparatus designed to be used more particularly on plates the curvature of whose edge is not intended to deviate more than, say, eighteen inches from a straight line.

Figure 10:
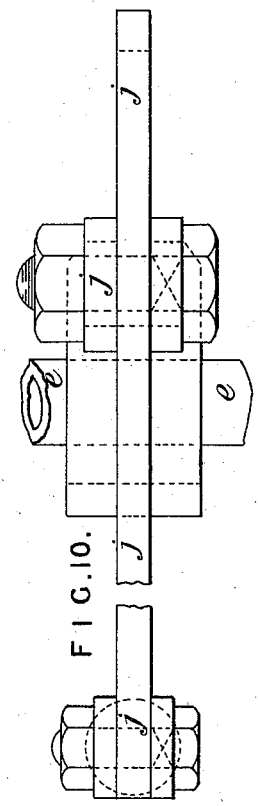

In the drawings, Figure 1 is a rear elevation, and Fig. 2 is a plan of the apparatus. Figs. 3 and 4 are an end view and plan, respectively, of the index and pointer arrangement. Fig. 5 is a partial end elevation showing how the apparatus is carried when in use on an armor-plate, and Fig. 6 is a partial end elevation showing how the apparatus hangs when hooked up for traveling. Figs. 7 and 8 are respectively an elevation and a plan of a form of adjustable foot suitable for use in cases where the edges to be indicated do not deviate from the straight line more than, say, about six inches. Figs. 9 and 10 are respectively an elevation and a plan of a modified form of foot suitable for use when the curvature of the edge to be indicated deviates from the straight line from about six to eighteen inches.

$a$ is a frame, which may be of angle-iron and of a length of, say, from fifteen to twenty feet.

$b$ represents two projecting feet, which may be of mild cast-steel. They are capable of being adjusted upon and rigidly fixed to the frame $a$ by means of the clamping-screws $c$.

$d$ represents blocks, say, of cast-iron, secured to the frame $a$ at short intervals and provided with caps forming a series of bearings in true alignment.

$e$ is a shaft, which may be hollow, extending the whole length of the frame $a$ and capable of turning in the bearings $d$, the said shaft having a pointer $h$ fixed at one end and a foot $j$ in any suitable position upon it.

$f$ is a terminal bearing for the shaft $e$, the said bearing being shaped so that a scale $g$, graduated, say, in eighths of an inch, can be carried or marked upon it, so that the pointer $h$ moves in proximity to the said scale and indicates the movement of rotation of the shaft $e$ to right or left from the initial or zero position.

The foot $j$ may be of mild steel and can be clamped by clamping-screws $k$ to any part of the shaft $e$ to which it is adjusted.

$l$ represents adjustable stops bolted or otherwise fastened to each of the feet $b$ to insure that they rest on the armor-plate at equal distances inward from its edge, which distance should be as small as possible consistent with the avoidance of any holes or inequalities the plate may have near its edge.

$m$ is an attachment for a suspending-chain clamped to the frame A at a suitable point on the side away from the plate.

$n$ represents two flat hooks fitting loosely the lower edge of the frame $a$ nearest the plate and attached to light tackles by which the apparatus can be quickly lowered onto the plate or raised so as to clear it.

$o$ is an attachment with chain and hook by which the foot $j$ can be fastened back, so as to be clear of the plate when the apparatus is in the traveling position.

The tackles from the hooks $n\,n$ and the chain from the attachment $m\,m$ are preferably hung from some portion of the framework carrying the upper douche, so that that douche can travel freely and take the apparatus with it, when the tackles connected to the attachments $n\,n$ and the hooks of the attachment *o o* are tightened and hooked up, while the disengagement of the tackles and of the hook of the attachment *o o* when the top douche is in its working position over the plate is all that is necessary to throw the apparatus into action.

Comparing Figs. 5 and 6 it will be observed that the working position is a thoroughly stable one, because the apparatus is so hung that in its working position the feet *b b* have no tendency to slip off the plate, but on the contrary would slide farther onto it if they were not prevented from so doing by the stops *l l*. The resting-points of the feet *b b* should be the same distance from the center line of the shaft *e e* as that of the foot *j j*, and it is convenient that the effective length of the index *h h* should equal this distance.

This apparatus is used as follows: While the armor-plate is being heated the true templet or mold for the shape of the edge to be "indicated" is supported in a convenient position, and the apparatus is lowered onto it by releasing the tackles of the attachments *n n* until the feet *b b* (previously clamped at suitable points on the frame *a a*) rest upon it at or near its extremities. The attachment *m m* should be shifted, if necessary, so that the apparatus supported on one side by the templet under the two feet *b b* and on the other side suspended from the attachment *m m* is in stable equilibrium. (This will be its position when at work, except that the edge of the armor-plate will replace the templet.) The foot *j j* is next moved along the shaft *e e* till it is midway, or about midway, between the two feet *b b* and while it rests upon the templet and the index *h h* is brought to the zero of the scale *g g*. By turning the shaft *e* the foot *j* is clamped rigidly to the shaft *e* by the screws *k k*. This completes the adjustment. The foot *j j* is next hooked up (now carrying the pointer *h h* with it) to the attachment *o o*, so as not to hang down and foul the plate when the douche moves over it, and the tackles are hauled up and secured to tilt up the frame *a a* and its attached feet *b b* for the same reason. When the hot armor-plate has been placed over the lower douche and the upper douche has been brought into position over it, the tackles are cast off and the feet *b b* brought to their proper position on the plate and the hook of the attachment *o o* is released, allowing the foot *j j* also to rest on the plate. The reading of the pointer *h h* is then noted to show what change of form has taken place up to this stage and the water turned on. The pointer is watched and its reading recorded—say, for example, every five minutes during the chilling operation— or the record may obviously be easily made automatic by means of a cylinder and pencil, as is well understood.

If two edges of the same plate are to be indicated, as is generally desirable, two complete sets of apparatus will enable this to be done.

Having now particularly described and ascertained the nature of my said invention and in what manner the same is to be performed, I declare that what I claim is—

1. In an indicating apparatus, the combination of a suitable support having bearings for a shaft, a shaft set in said bearings and adapted to freely rock therein, with three feet, two of which are attached to said support and the third is secured to said shaft and moves with it, and an index on the shaft to indicate the movement of the movable foot, substantially as described.

2. In an indicating apparatus, the combination of a suitable support having bearings for a shaft, a shaft set in said bearings and adapted to freely rock therein with three legs, two of which are movable lengthwise of said support, and the third attached to the shaft and moving with it, and an index on the shaft to indicate the movement of the movable foot, substantially as described.

3. In an indicating apparatus, the combination of a frame *a*, two feet *b* attached to said frame, a shaft *e* capable of motion in said frame, a movable foot *j* attached to said shaft, a pointer *h* also attached to the shaft, and the terminal bearing *f* carrying a scale *g*, substantially as described and shown.

In testimony whereof I have signed my name to this specification in the presence of two subscribing witnesses.

T. J. TRESIDDER.

Witnesses:
J. D. PRYCE,
C. B. HOBBIS.